United States Patent
Miki et al.

(10) Patent No.: US 7,880,439 B2
(45) Date of Patent: Feb. 1, 2011

(54) BATTERY-CAPACITY MANAGEMENT DEVICE

(75) Inventors: Masayuki Miki, Shizuoka-ken (JP); Satoshi Yamamoto, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 586 days.

(21) Appl. No.: 11/971,806

(22) Filed: Jan. 9, 2008

(65) Prior Publication Data
US 2008/0180064 A1    Jul. 31, 2008

(30) Foreign Application Priority Data
Jan. 10, 2007    (JP)    .............................. 2007-001925

(51) Int. Cl.
*H01M 10/46*    (2006.01)
(52) U.S. Cl. ..................................... 320/132
(58) Field of Classification Search ................. 320/107, 320/112, 114, 132, 149, 150; 324/426, 427, 324/431, 433; 429/90, 91; 702/63, 64, 65
See application file for complete search history.

(56) References Cited

U.S. PATENT DOCUMENTS 6,018,694 A * 1/2000 Egami et al. ................ 701/102
6,232,746 B1 * 5/2001 Yamanashi ................... 320/132
2007/0278991 A1  12/2007 Miyata

FOREIGN PATENT DOCUMENTS

JP    2001-128385    5/2001
JP    2006-114312    4/2006

* cited by examiner

*Primary Examiner*—Edward Tso
(74) *Attorney, Agent, or Firm*—Keating & Bennett, LLP

(57) ABSTRACT

A battery-capacity management device comprises a charged/discharged-capacity integrating unit that detects a voltage and a current of a driving battery and that calculates a discharged capacity of the driving battery. The device also comprises a battery temperature sensor that detects a temperature of the driving battery, a memory, and an available-capacity calculating unit. Map data that represents relationships among voltages, currents, and temperatures of the driving battery at states in which remaining capacity of the driving battery has reached a preset value can be stored in the memory. The available-capacity calculating unit calculates a renewed available capacity of the driving battery based on a discharge capacity discharged over a period between a time when the driving battery is charged and a time when the voltage value detected by the charged/discharged-capacity integrating unit reaches a voltage value corresponding to the current value and the battery temperature in the map data.

16 Claims, 4 Drawing Sheets

US 7,880,439 B2

BATTERY-CAPACITY MANAGEMENT DEVICE

CROSS-REFERENCE TO RELATED APPLICATIONS

This application claims the priority benefit of Japanese Patent Application No. 2007-001925, which was filed on Jan. 10, 2007 and which is hereby incorporated by reference in its entirety.

BACKGROUND OF THE INVENTION

1. Field of the Invention

The present invention generally relates to a battery-capacity management device capable of determining an available capacity of a battery depending upon the state of the battery.

2. Description of the Related Art

Conventionally, electric vehicles, such as golf carts, have been proposed in which the electric vehicle is provided with a battery-capacity management device that controls a charge capacity to an available capacity (i.e., capacity at a fully-charged condition), which available capacity has been obtained through a predetermined computation (see JP-A-2001-128385, for example). Such a battery-capacity management device (i.e., a battery management device) was featured on an electric-vehicle power system of a power-assisted bicycle. The battery management device was capable of altering when charging would be discontinued based upon a state of the battery. More specifically, the battery-capacity management device changed the condition when charging would be discontinued based on an available capacity. The available capacity was any one of: a value of a discharged-for-running capacity, which is a capacity discharged to cause a vehicle to run until a battery voltage drops to a preset available-capacity-determining voltage value; a discharged-for-refresh capacity which is a capacity discharged to cause the battery voltage to drop to a preset voltage value for refresh discharge; and a total of these values.

SUMMARY OF THE INVENTION

However, the conventional battery-capacity management device is disadvantageous in that, because the available-capacity determining voltage value or the preset voltage value is constant irrespective of the degree to which the battery has deteriorated over timed, the available capacity obtained through computation may be inaccurate depending on the deterioration of the battery. Some electric vehicles, such as golf carts, for example, are configured such that the battery discharges electricity during operation on a flat area or uphill while the battery is charged with electricity while running downhill due to regeneration of energy. Hence, it is difficult to obtain an appropriate available capacity of a golf cart that operates with repeated charging and discharging of the battery using the conventional battery-capacity management device.

Certain features, aspects and advantages of the present invention have been conceived to cope with the problem and aim at providing a battery-capacity management device capable of determining an available capacity of a battery by changing the available capacity according to a state of the battery.

Thus, one aspect of some embodiments of the present invention involves a battery-capacity management device comprising a voltage detector adapted to detect a terminal voltage of a battery and a current detector adapted to detect a discharge current discharged from the battery. The device also comprises a discharged-capacity calculating unit adapted to calculate a discharged capacity of the battery and a storage location adapted to contain prestored map data that represents relationships between terminal voltages and discharge currents of the battery at states in which a remaining capacity of the battery has reached a preset value. The device further comprises an available-capacity calculating unit adapted to calculate a second available capacity of the battery based on a specific discharged capacity, where the specific discharged capacity is calculated by the discharged-capacity calculating unit and is a capacity discharged over a period between a time when charging of the battery to a first available capacity thereof is completed and a time when the terminal voltage of the battery detected by the voltage detector reaches a voltage value corresponding to the current value detected by the current detector in the map data. The available-capacity calculating unit preferably also updates the first available capacity to the second available capacity.

Another aspect of some embodiments of the present invention involves a battery-capacity management device that comprises a voltage detector that is adapted to detect a terminal voltage of a battery, a current detector that is adapted to detect a discharge current discharged from the battery and a battery-temperature detector that is adapted to detect a temperature of the battery. The device also comprises a discharged-capacity calculating unit that is adapted to calculate a discharged capacity of the battery and memory that is adapted to contain prestored map data that represents relationships among terminal voltages, discharge currents, and battery temperatures of the battery at states in which a remaining capacity of the battery has reached a preset value. The device further comprises an available-capacity calculating unit that is adapted to calculate a second available capacity of the battery based on a specific discharged capacity, where the specific discharged capacity is calculated by the discharged-capacity calculating unit and is a capacity discharged over a period between a time when charging of the battery to a first available capacity thereof is completed and a time when the terminal voltage of the battery detected by the voltage detector reaches a voltage value corresponding to the current value detected by the current detector and a battery temperature detected by the battery-temperature detector in the map data. Preferably, the available-capacity calculating unit also updates the first available capacity to the second available capacity.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT

Figure 1:
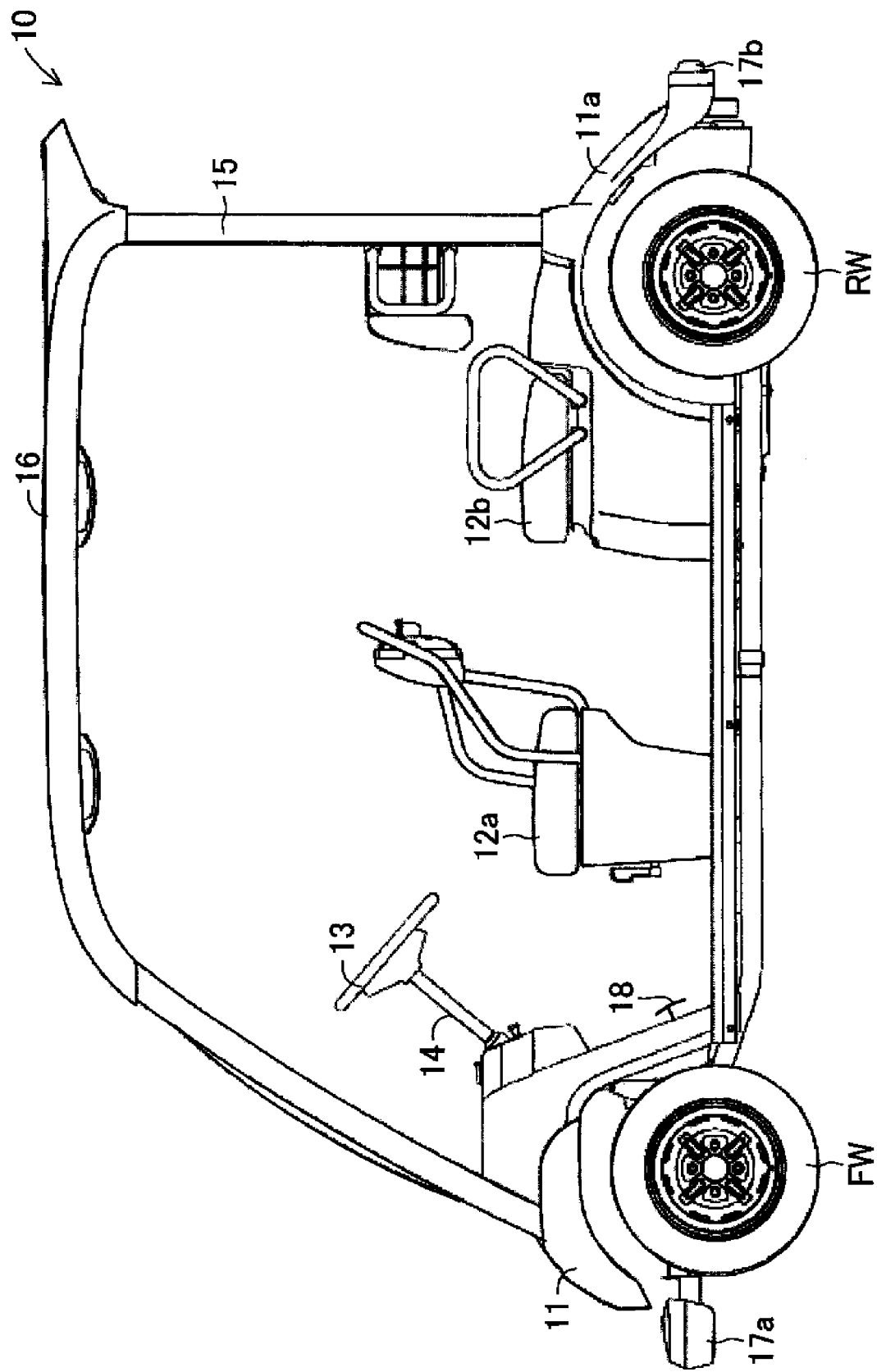
FIG. 1 is a side view of a golf cart having an embodiment of a battery-capacity management device that is arranged and configured according to certain features, aspects and advantages of the present invention.

A preferred embodiment that is arranged and configured in accordance with certain features, aspects and advantages of the present invention will be described in detail with reference to the drawings. FIG. 1 shows a golf cart 10 that comprises a battery-capacity management device 20 (see FIG. 2) that is arranged and configured in accordance with certain features, aspects and advantages of an embodiment of the present invention. The golf cart 10 comprises a pair of front wheels FW (only one is shown in the drawing) on left and right sides, respectively, of a front portion of a bottom of a body 11 and a pair of rear wheels RW (only one is shown in the drawing) on left and right sides, respectively, of a rear portion of the bottom of the body 11. A front seat 12a for two passengers and a rear seat 12b for three passengers can be provided in a center of an interior of the body 11. The front seat 12a and the rear seat 12b preferably are generally parallel with each other. A steering wheel 13 is carried by a steering shaft 14 generally forward of a driver's seat of the front seat 12a, which is in the front portion of the body 11.

A roof 16 is provided on a top of the body 11. A support frame 15 carries the roof 16 and connects the roof 16 to the body 11. The support frame 15 preferably extends to four corners of the body 11. A bumper 17a connects to a front end of the bottom of the body 11. A bumper 17b connects to a rear end of a bottom of a cowl 11a, which covers a portion of a rear portion of the body 11.

The golf cart 10 allows manual and automatic operation. In a manual operation mode, when a driver seated at the front seat 12a rotates the steering wheel 13 to steer the front wheels FW to the left or right, the golf cart 10 is turned to the left or right to change its traveling direction while moving.

In an automatic operation mode, a lower portion and an upper portion of the steering shaft 14 supporting the steering shaft 13, which are coupled to each other, are disconnected, and simultaneously a steering motor (not shown) on the lower portion of the steering shaft 14 is actuated to rotate the lower portion of the steering shaft 14 under control of a controller 30, which can be included in the battery-capacity management device 20. The front wheels FW are changed in their direction to the left or right in response to the rotation.

In the front portion of the body 11, an accelerator pedal (not shown) and a brake pedal 18 are provided side by side below the steering handle 13. A driving motor 19 (see FIG. 2) for driving the rear wheels RW and so forth can be provided in the rear portion of the body 11.

The accelerator pedal and the brake pedal 18 are operated by the driver in the manual operation mode. When the driver depresses the accelerator pedal, which is connected to the controller 30, the driving motor 19 is operated according to a position (displacement) of the accelerator pedal, thereby rotating the rear wheels RW. More displacement of the accelerator pedal causes the golf cart 10 to run at an increasing speed. In the automatic operation mode, the driving motor 19 is actuated to rotate the rear wheels RW under the control of the controller 30.

The brake pedal 18 can be coupled to disk brakes, which can be provided on each of the front wheels FW and the rear wheels RW, through a hydraulic disk brake system (not shown). The brake pedal 18 can be connected to the controller 30 through a braking motor (not shown), for example. When the driver depresses the brake pedal 18, displacement (depressing force) of the brake pedal 18 is transmitted to the disk brakes through the hydraulic disk brake system, for example, and the disk brakes are actuated to slow or stop rotation of the front wheels FW and the rear wheels RW. In the automatic operation mode, the braking motor is actuated under control of the controller 30. Thus, the braking motor causes movement of the brake pedal 18, or a component connected to the brake pedal 18, thereby causing operation of the hydraulic disk brake system and the disk brakes slow or stop rotations of the front wheels FW and the rear wheels RW.

Figure 2:
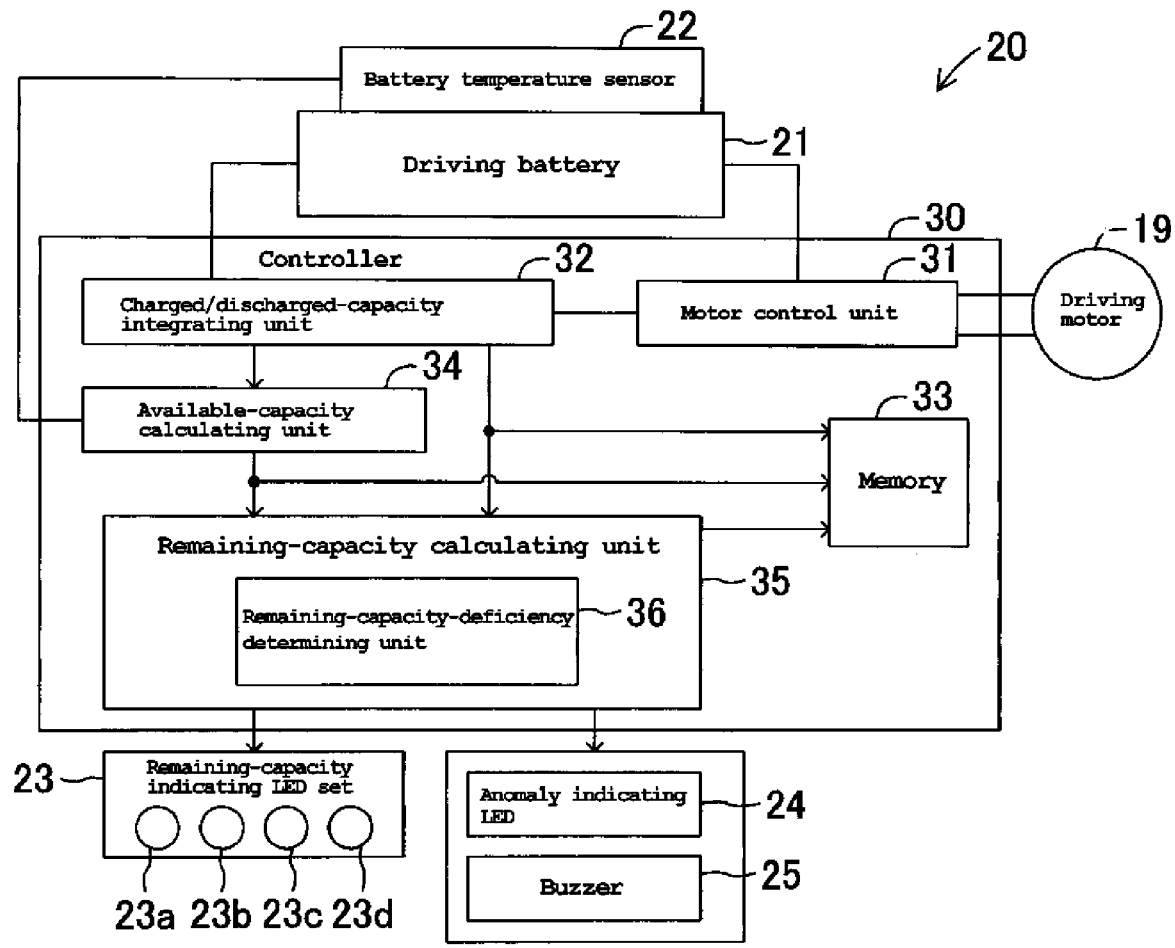
FIG. 2 is a block diagram showing a configuration of the battery-capacity management device of FIG. 1.

In some embodiments, the battery-capacity management device 20 is provided generally below, or inside of, the rear seat 12b of the body 11. As shown in FIG. 2, the battery-capacity management device 20 comprises, in addition to the controller 30, a driving battery 21. The driving battery 21 can comprise a lead-acid battery and a battery temperature sensor 22, which defines a battery-temperature detector. The battery-capacity management device 20 also can comprise a remaining-capacity indicating LED (light-emitting diode) set 23, which defines a display that can indicate a remaining capacity of the driving battery 21, an anomaly indicating LED 24 that can indicate that the remaining capacity of the driving battery 21 has dropped to an anomalous value equal to or lower than a predetermined value, and a buzzer or other type of alert 25 that can gain the attention of a user or operator when the remaining capacity of the driving battery 21 has dropped to an anomalous value equal to or lower than the predetermined value. The driving battery 21 preferably supplies electric power that is used to operate the driving motor 19 through a motor control unit 31, which can be formed in the controller 30.

The controller 30 also comprises, in addition to the motor control unit 31, a charged/discharged-capacity integrating unit 32 that calculates a charged capacity and a discharged capacity based on voltages and currents at the driving battery 21, a memory 33, an available-capacity calculating unit 34, and a remaining-capacity calculating unit 35. The charged/discharged-capacity integrating unit 32 preferably detects voltage values and current values of the driving battery 21 at predetermined short time intervals, calculates a charged/discharged capacity, and transmits values of the charged/discharged capacity to the available-capacity calculating unit 34, the memory 33, and the remaining-capacity calculating unit 35 as detection signals. More specifically, some embodiments of the charged/discharged-capacity integrating unit 32 comprise a voltage detector, a current detector, and a discharged-capacity integrator.

The memory 33 preferably comprises ROM (read only memory) and RAM (random access memory) in some embodiments. The memory 33 can store a program, map data, and so forth, which will be described later, and can store a variety of data sets in a rewritable manner. More specifically, in some embodiments, the ROM stores the program, such as that shown in FIG. 3, map data, such as that shown in FIGS. 4 and 5, and so forth. The RAM can store each of a variety of data sets that can be sequentially transmitted from the charged/discharged-capacity integrating unit 32, the available-capacity calculating unit 34, and the remaining-capacity calculating unit 35 while overwriting a corresponding one of existing data sets. The available-capacity calculating unit 34 preferably calculates an available capacity of the driving battery 21 based on data relating to the voltage value, the current value, and the charged/discharged capacity transmitted from the charged/discharged-capacity integrating unit 32, and map data stored in the memory 33, for instance.

The remaining-capacity calculating unit 35 preferably calculates a remaining capacity of the driving battery 21 based on data relating to the charged/discharged capacity transmitted from the charged/discharged-capacity integrating unit 32 and data relating to the available capacity transmitted from the available-capacity calculating unit 34. The remaining-capacity calculating unit 35 preferably comprises a remaining-capacity-deficiency determining unit 36 that evaluates whether the remaining capacity of the driving battery 21 is equal to or higher than a preset minimum value.

The remaining-capacity indicating LED set 23 preferably is positioned at a prominent position for a driver. In some embodiments, the remaining-capacity indicating LED set 23 is positioned near the steering shaft 14 in the interior of the golf cart 10, and visually displays the remaining capacity calculated by the remaining-capacity calculating unit 35. More specifically, the illustrated remaining-capacity indicating LED set 23 includes four lamps 23a, 23b, 23c, 23d, each formed with an LED. Each of the lamps 23a, 23b, 23c, 23d can be turned on, flashed, and be turned off in accordance with the remaining capacity calculated by the remaining-capacity calculating unit 35. In some embodiments, the flashing LED indicates the current level, the turned off LED indicates a previous level and a turned on LED indicates a level that currently is exceeded.

More specifically, when the remaining capacity is close to a fully-charged remaining capacity of the driving battery 21, all of the lamps 23a, 23b, 23c, 23d are turned on. When the remaining capacity decreases to be smaller than the fully-charged remaining capacity, the first lamp 23a is caused to flash while the other lamps 23b, 23c, 23d remain on. When the remaining capacity further decreases, the first lamp 23a is turned off while the other lamps 23b, 23c, 23d are remain on. When the remaining capacity still further decreases, the second lamp 23b flashes, which is followed by a similar operation cycle of the lamps. That is, as the remaining capacity decreases, the lamps 23a to 23d flash and then are turned off one at a time. Other display types also can be used.

The anomaly indicating LED 24 can be formed with an LED lamp and can be disposed at a prominent position for the driver near the steering shaft 14 in the interior of the golf cart 10. The anomaly indicating LED 24 preferably flashes when the remaining-capacity-deficiency determining unit 36 determines that the remaining capacity of the driving battery 21 is equal to or smaller than the preset minimum value, thereby visually informing the driver that the driving battery 21 needs to be charged. At this time, the buzzer 25 or other type of alert (e.g., audible or tactile) also is activated to inform the driver that the driving battery 21 needs to be charged.

The controller 30 has a CPU (central processing unit) (not shown) that comprises a control function. In some embodiments, the CPU performs a variety of computations and so forth to operate the battery-capacity management device 20. In addition to the program and map data described above, a variety of programs and data sets, such as map data, for starting, running, and stopping the golf cart 10 can be stored in the memory 33. More specifically, the memory 33 temporarily stores various data sets, such as a detection signal of a running speed detected by and transmitted from a vehicle speed sensor (not shown) mounted on the body 11 of the golf cart 10, for example. The CPU of the controller 30 preferably performs predetermined operations and computations based on the program, map data, various detection data sets, and so forth stored in the memory 33, thereby causing the golf cart 10 to start, run, and stop via the motor control unit 31.

To manually operate the golf cart 10 having the above configuration, the driver first sits on a seat of the front seat 12a behind the steering wheel 13. The driver then turns on a power switch (not shown) or the like, and depresses the accelerator pedal. Accordingly, the driving motor 19 operates to cause the golf cart 10 to start moving. After the power switch is turned on, the remaining-capacity indicating LED set 23 indicates a remaining capacity of the driving battery 21 so that the driver can check the remaining capacity of the driving battery 21.

The driving battery 21 of the golf cart 10 can be connected to a charger for charging during nighttime or during other opportunities when the golf cart 10 is not being used. Hence, before the next use of the golf cart 10, the driving battery 21 advantageously has a remaining capacity equal to or close to its available capacity (i.e., a fully-charged capacity). The available capacity of the driving battery 21 preferably is updated each time when the remaining capacity reaches a predetermined value and stored in the memory 33. This allows an available capacity to be set according to a state of the driving battery 21 even when the driving battery 21 is gradually deteriorated through usage.

Figure 3:
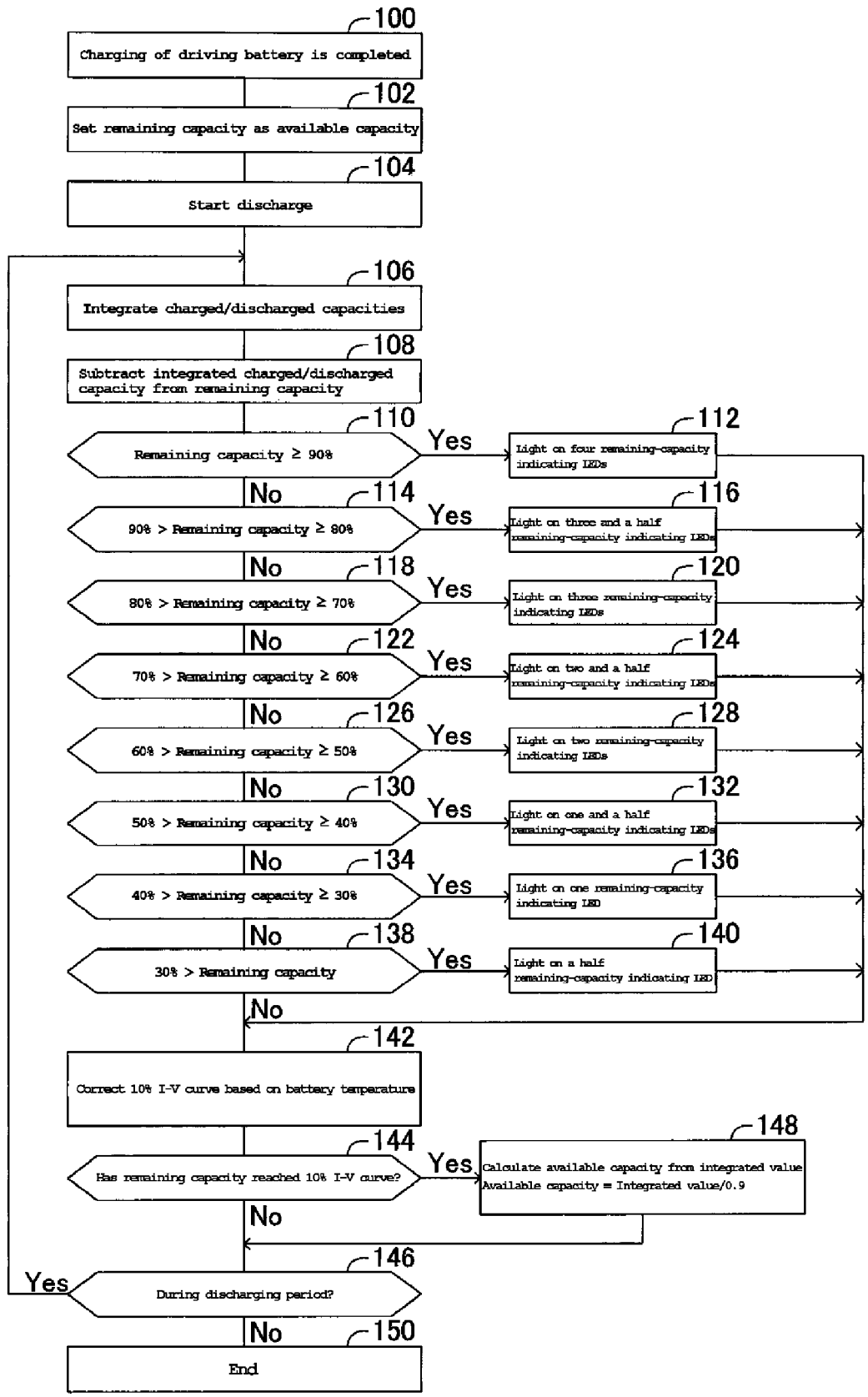
FIG. 3 is a flowchart showing a program for indicating a remaining capacity with a remaining-capacity indicating LED set and for setting an available capacity.

The indication of the remaining capacity with the remaining-capacity indicating LED set 23 and the calculation of the remaining capacity preferably are performed in accordance with a program routine or subroutine such as that shown in the flowchart of FIG. 3. In some embodiments, after the driving battery 21 has been charged, the CPU of the controller 30 repeatedly executes the program of the flowchart shown in FIG. 3 at predetermined time intervals. In other words, the routine of FIG. 3 is periodically executed.

With reference to the flowchart shown in FIG. 3, when the driving battery 21 has been charged, processing under the program starts (see 100). Then, a remaining capacity (i.e., an initial available capacity) is read (see 102), which remaining capacity may have been obtained through a previous execution of the program and stored in the memory 33. The value is set as a preset value.

Subsequently, the driving battery 21 starts to discharge (see 104). During discharging of the driving battery 21, the charged/discharged-capacity integrating unit 32 starts integration of charged/discharged capacities (see 106). In some embodiments, the integration is performed by the discharged-capacity integrator included in the charged/discharged-capacity integrating unit 32 that totals charging and discharging currents sequentially. The thus calculated charged/discharged capacity value can be temporarily stored in the memory 33. The electricity discharged from the driving battery 21 is primarily used to run the golf cart 10.

In some embodiments, when the golf cart 10 runs uphill or runs at an increasing speed, the driving battery 21 discharges electricity, whereas when the golf cart 10 decelerates when running downhill or the like, the driving battery 21 is charged by regenerative braking. The charged/discharged capacity then is subtracted from the remaining capacity obtained earlier (see 106), thereby calculating a remaining capacity of the present time (see 108). The calculation preferably is performed by the remaining-capacity calculating unit 35. Once the remaining capacity at the present time has been determined (see 108), then the remaining capacity is checked to see if it is equal to or larger than 90% of the initial available capacity (see 110).

More specifically, the determination is made by evaluating whether the remaining capacity obtained in 108 is equal to or larger than 90% of the initial remaining capacity (i.e., initial available capacity). When the remaining capacity obtained in 108 is equal to or larger than 90% of the initial remaining capacity, a result of determination in 108 is Yes, and processing under the program proceeds to 112. In 112, all of the lamps 23a, 23b, 23c, 23d of the remaining-capacity indicating LED set 23 are turned on. Subsequently, processing under the program proceeds to 142, in which a temperature value of the driving battery 21 detected by the battery temperature sensor 22 is read, and an I-V curve is corrected based on the temperature value. The correction is performed based on maps stored in the memory 33 such as those shown in FIGS. 4 and 5.

Figure 4:
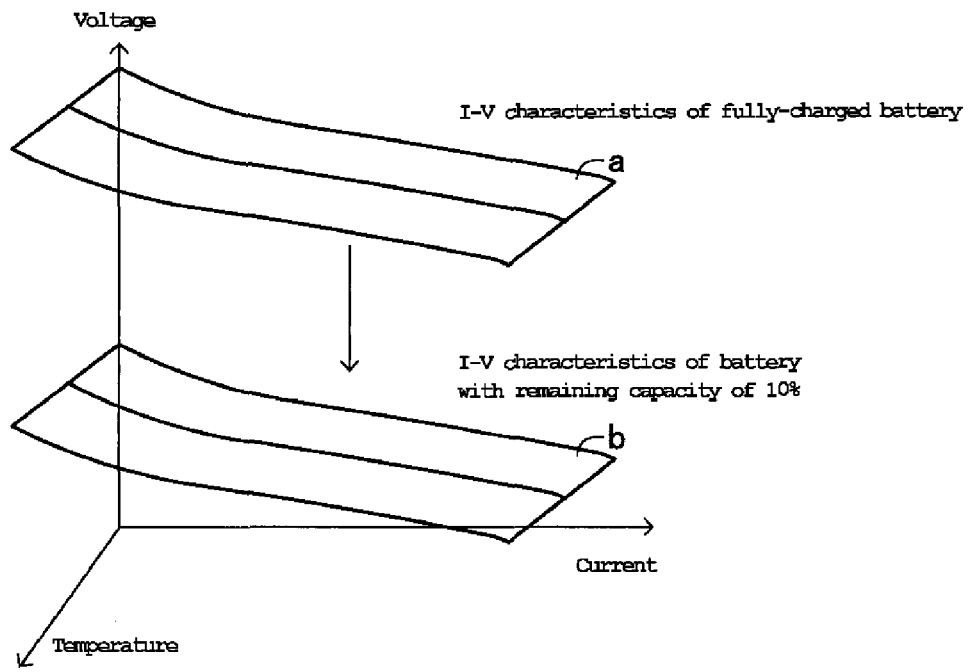
FIG. 4 is a graph showing an I-V curve of a driving battery in a brand-new state.
Figure 5:
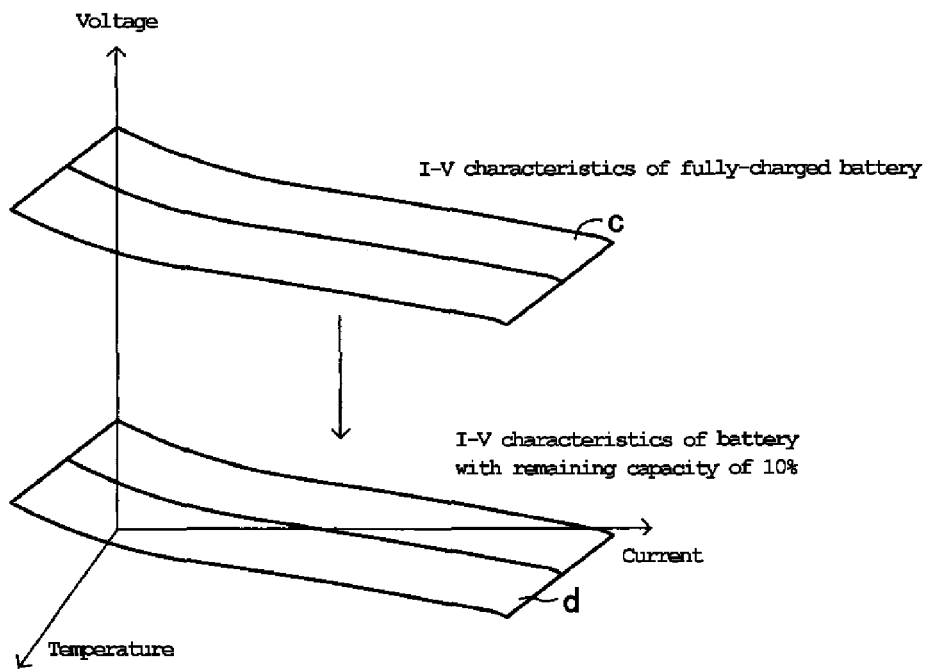
FIG. 5 is a graph showing an I-V curve of a driving battery at a deteriorated state.

FIG. 4 shows I-V curves (current-voltage characteristics) of the driving battery 21 in a brand-new state. FIG. 5 shows I-V curves of the driving battery 21 deteriorated to near a usable limit. In FIGS. 4 and 5, each of horizontal axes represents a current value, each of vertical axes represents a voltage value, and each of axes extending far and near relative to a viewer of the drawings represents a battery temperature. Each of a region "a" in FIG. 4 and a region "c" in FIG. 5 represents relationships among the values at states in which the remaining capacity of the driving battery 21 is equal to the fully-charged capacity (available capacity). Each of a region "b" in FIG. 4 and a region "d" in FIG. 5 represents relationships among the values at states in which the remaining capacity of the driving battery 21 is 10% of the fully-charged capacity. In other words, the driving battery 21 needs to be charged when the remaining capacity drops to 10% of the fully-charged capacity.

FIGS. 4 and 5 indicate that the voltage value increases as the current value decreases, and, when the current value is kept constant, an increase in the battery temperature slightly increases the voltage value. Accordingly, when the driving battery 21 is in a brand-new state and has a fully-charged remaining capacity, the current value, the voltage value and the battery temperature fluctuate in the region "a" of FIG. 4 in response to fluctuations in these values and in response to fluctuations in the battery temperature due to running of the golf cart 10. As the golf cart 10 runs to thereby decrease the remaining capacity of the driving battery 21, the I-V curve of the driving battery 21 gradually shifts from the region "a" toward the region "b."

In a case in which the driving battery 21 is in a brand-new state, a region corresponding to the temperature of the driving battery 21 detected by the battery temperature sensor 22 and between the region "a" and the region "b" of the map of FIG. 4 (plane parallel to the horizontal axis and the vertical axis) is selected in 142. Processing under the program proceeds to 144, in which whether the remaining capacity of the driving battery 21 has dropped to reach a 10%-I-V curve is determined. More specifically, the determination is made by determining whether a portion (e.g., a point on the map) corresponding to the current value and the voltage value detected by the charged/discharged-capacity integrating unit 32, for example, in the region defined in 142 has reached the region "b."

When the remaining capacity of the driving battery 21 has not reached the 10%-I-V curve, a result of determination in 144 is No, and processing under the program proceeds to 146. In 146, whether the driving battery 21 is still in a discharging period (e.g., the golf cart 10 is running) is determined. When it is determined that the golf cart 10 is no longer running, processing proceeds to 150 and ends. The driving battery 21 then can be connected to a charger to be charged to the available capacity during time that the golf cart 10 is not being used. The same procedure can be repeated when the golf cart 10 is used next time.

When it is determined that the golf cart 10 is still running and a result of determination in 146 is Yes (i.e., the golf cart 10 is still be used), processing under the program returns to 106. After the operations pertaining to 106 and 108 are performed, whether the remaining capacity of the driving battery 21 is equal to or larger than 90% is determined in 110. When the remaining capacity of the driving battery 21 is determined to be smaller than 90%, a result of determination in 110 is No, and processing under the program proceeds to 114. In 114, whether the remaining capacity of the driving battery 21 is equal to or larger than 80% and smaller than 90% is determined. When the remaining capacity of the driving battery 21 is determined to be equal to or larger than 80% and smaller than 90%, a result of determination in 114 is Yes, and processing proceeds to 116.

In 116, the lamp 23a of the remaining-capacity indicating LED set 23 is caused to flash while the other lamps 23b, 23c, 23d are caused to stay turned on. Subsequently, processing under the program proceeds to 142 to perform the operation described above according to the temperature of the driving battery 21. When the remaining capacity of the driving battery 21 has not reached the 10%-I-V curve, the operation pertaining to 146 is performed. When the golf cart 10 is running and the result of determination made in 146 is Yes, processing under the program proceeds to 106 again. Thereafter, the procedure from 106 to 146 is repeatedly performed until the remaining capacity of the driving battery 21 reaches the 10%-I-V curve.

In 118, whether the remaining capacity of the driving battery 21 is equal to or larger than 70% and smaller than 80% is determined. When the remaining capacity of the driving battery 21 is equal to or larger than 70% and smaller than 80%, the lamp 23a is turned off and the lamps 23b, 23c, 23d are caused to remain on in 120. When the remaining capacity of the driving battery 21 equal to or larger than 80% or is smaller than 70%, processing proceeds to 122. In 122, whether the remaining capacity of the driving battery 21 is equal to or larger than 60% and smaller than 70% is determined. When the remaining capacity of the driving battery 21 is determined to be equal to or larger than 60% and smaller than 70%, the lamp 23a remains off, the lamp 23b is caused to flash, and the lamps 23c, 23d remain on in 124. When the remaining capacity of the driving battery 21 equal to or larger than 70% or is smaller than 60%, processing proceeds to 126.

In 126, whether the remaining capacity of the driving battery 21 is equal to or larger than 50% and smaller than 60% is determined. When the remaining capacity of the driving battery 21 is determined to be equal to or larger than 50% and smaller than 60%, the lamp 23b is turned off, and the lamps 23c, 23d remain on in 128. When the remaining capacity of the driving battery 21 is determined to be equal to or larger than 60% or smaller than 50%, processing proceeds to 130. In 130, whether the remaining capacity of the driving battery 21 is equal to or larger than 40% and smaller than 50% is determined. When the remaining capacity of the driving battery 21 is determined to be equal to or larger than 40% and smaller than 50%, the lamp 23c is caused to flash and the lamp 23d remains on in 132. When the remaining capacity of the driving battery 21 is determined to be equal to or larger than 50% or smaller than 40%, processing proceeds to 134.

In 134, whether the remaining capacity of the driving battery 21 is equal to or larger than 30% and smaller than 40% is determined. When the remaining capacity of the driving battery 21 is determined to be equal to or larger than 30% and smaller than 40%, the lamp 23c is turned off and the lamp 23d remains on in 136. When the remaining capacity of the driving battery 21 is determined to be equal to or larger than 40% or smaller than 30%, processing proceeds to 138. In 138, whether the remaining capacity of the driving battery 21 is smaller than 30% is determined. When the remaining capacity of the driving battery 21 is determined to be smaller than 30%, the lamp 23d is caused to flash. When the remaining capacity of the driving battery 21 is determined to be equal to or larger than 30%, processing proceeds to 142.

In 114 to 140, a procedure is used such that when the remaining capacity of the driving battery 21 falls into each of the preset ranges, the status of the remaining capacity indicated with the lamps 23a to 23d of the remaining-capacity indicating LED set 23 is changed, whereas when the remaining capacity falls out of each preset range, processing proceeds on for a next smaller range not only in a case in which the remaining capacity takes a small value deviating from the preset range but also a case in which the remaining capacity takes a large value deviating from the preset range. In other words, if the driving battery 21 receives a charge during regenerative operation, the number of lamps illuminated, for instance, can increase. The reason for adopting such a procedure is to allow for fluctuations in the remaining capacity of the driving battery 21.

More specifically, the driving battery 21 of the golf cart 10 employs a regenerative braking control and is configured to discharge electricity when running on a flat area or uphill while the driving battery 21 is configured to be charged when running downhill. Accordingly, the remaining capacity of the driving battery 21 can increase from the preset range as described above, depending on whether the golf cart 10 is operating uphill or downhill, depending upon the battery temperature, and so forth, although the capacity generally decreases on the whole as the golf cart 10 runs. The procedure shown in FIG. 3, however, also takes the fluctuation into consideration.

When the remaining capacity of the driving battery 21 reaches the 10%-I-V curve, the result of determination in 144 is Yes, and processing under the program proceeds to 148. In 148, the available-capacity calculating unit 34 calculates a renewed available capacity based on the integrated value calculated by the charged/discharged-capacity integrating unit 32. In the example calculation using the map shown in FIG. 4, the remaining capacity has dropped to 10% of the fully-charged remaining capacity (100%), indicating that 90% of the available capacity has been discharged. Therefore, the renewed available capacity, which is the available capacity of the driving battery 21 at the present time, can be obtained by dividing the integrated value of the actually-discharged electricity, which is obtained through integration by the charged/discharged-capacity integrating unit 32, by 0.9. The thus obtained renewed available capacity value is stored in the memory 33 as an updated available capacity.

Processing under the program proceeds to 146, in which whether the driving battery 21 is still in the discharging period (e.g., the golf cart 10 is running) is determined. When it is determined that the golf cart 10 is still running and a result of determination in 146 is Yes, processing under the program returns to 106, repeating the above-described operations. When the golf cart 10 has run a predetermined course, the golf cart 10 is stopped, and charging of the driving battery 21 is started. The charging of the driving battery 21 is performed based on the renewed available capacity calculated in the operation pertaining to 148. When the remaining capacity of the driving battery 21 drops to an anomalous value equal to or lower than the predetermined value during running of the golf cart 10 after having reached the 10%-I-V curve, the anomaly-indicating LED 24 flashes and the buzzer 25 sounds an alarm.

When it is determined that the golf cart 10 is no longer running in 146, processing proceeds to 150 and the routine ends. The driving battery 21 is charged to the above-described renewed available capacity. The same procedure described above then can be repeated the next day that the golf cart 10 is used. As the driving battery 21 is repeatedly used as described above over a long period of time, the driving battery 21 deteriorates (e.g., cannot hold as much of a charge), which can be detected by a battery-deterioration determining unit (not shown), which can be included in the controller 30. The detection can be performed at regular intervals via a personal computer or the like by connecting the controller 30 to the personal computer, for example.

When, for example, the driving battery 21 of which available capacity in a brand-new state is 60 Ah is deteriorated to have an available capacity of 20 Ah, the program shown in FIG. 3 is executed based on the map shown in FIG. 5, for example, in place of the map shown in FIG. 4. When the available capacity of the driving battery 21 is between 20 and 60 Ah, a value of the available capacity is determined through linear interpolation. When the available capacity is between 20 and 60 Ah, a time period over which the remaining capacity of the driving battery 21 decreases to reach the 10%-I-V curve is shorter than that of the brand-new driving battery 21; however, the remaining capacity decreases in a similar manner to that of the brand-new driving battery 21 described above. Hence, repeated descriptions thereof are omitted.

As described above, in some embodiments of the battery-capacity management device 20, map data representing the relationships among the voltage values, current values, and temperatures of the driving battery 21 of which remaining capacity has reached a preset value can be created in advance and stored in the memory 33. The renewed available capacity of the driving battery 21 is calculated based on a capacity discharged until a voltage value of the driving battery 21 having been charged to the initial available capacity reaches the voltage value corresponding to the current value and the battery temperature in the map data, and updating to the thus calculated renewed available capacity is performed.

The battery-capacity management device 20 is able to obtain the available capacity of the driving battery 21 more accurately in response to fluctuations in the voltage of the driving battery 21. The battery-capacity management device 20 is able to obtain the available capacity of the driving battery 21 accurately in response to changes in temperature as well. The battery-capacity management device 20 according to some embodiments includes the battery-deterioration determining unit that determines the degree of deterioration of the driving battery 21 so that the charged/discharged-capacity integrating unit 32 calculates the discharged capacity based on map data corresponding to the degree of deterioration of the driving battery 21 determined by the battery-deterioration determining unit, and so that the available-capacity calculating unit 34 calculates the available capacity according to the discharged capacity.

Accordingly, even when the driving battery 21 deteriorates with use, the available capacity of the driving battery 21 can be obtained more accurately according to deterioration of the battery. Furthermore, the battery-capacity management device 20 according to some embodiments includes the remaining-capacity calculating unit 35 that calculates the remaining capacity of the driving battery 21 and the remaining-capacity indicating LED set 23 that indicates information representing the remaining capacity of the driving battery 21 calculated by the remaining-capacity calculating unit 35. This allows a driver to easily check an accurate remaining capacity of the driving battery 21.

In addition, some embodiments of the battery-capacity management device 20 include the remaining-capacity-deficiency determining unit 36 that detects if the remaining capacity of the driving battery 21 drops to an anomalous value below the predetermined value, and the anomaly-indicating LED 24 that flashes and the buzzer 25 that sounds an alarm when the remaining capacity drops to the anomalous value below the predetermined value. This allows a driver to be informed of abnormal drop of the remaining capacity of the driving battery 21 easily. The golf cart 10, therefore, can allows continuous control of a state of the driving battery 21 and appropriate charging of the battery as desired can be provided.

The battery-capacity management device according to the present invention is not limited to the embodiment described above, and can be modified as desired. For example, the map data in some embodiments is created based on voltages, currents, and temperatures; however, the map data can alternatively be created based on only the voltages and currents. The driving battery 21 according to some embodiments is a lead-acid battery; however, a different battery such as a nickel-cadmium battery, a nickel-metal hydride battery, or a lithium-ion battery can be employed as the driving battery 21.

When a different battery other than the lead-acid battery is employed as the driving battery 21, charging of the battery at a state in which a remaining capacity of the battery has not reached the 10%-V-I curve is to be performed after a refresh discharge of the battery. This reduces the likelihood of the battery developing a memory effect. Moreover, while the battery-capacity management device 20 is provided in the golf cart 10, the battery-capacity management device can be used not only in a golf cart but also in various apparatuses having a battery such as an automobile or a motorcycle.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A battery-capacity management device comprising:
    a voltage detector adapted to detect a terminal voltage of a battery;
    a current detector adapted to detect a discharge current discharged from the battery;
    discharged-capacity calculating unit adapted to calculate a discharged capacity of the battery;
    a storage location adapted to contain prestored map data that represents relationships between terminal voltages and discharge currents of the battery at states in which a remaining capacity of the battery has reached a preset value; and
    an available-capacity calculating unit adapted to calculate a second available capacity of the battery based on a specific discharged capacity, the specific discharged capacity being calculated by the discharged-capacity calculating unit and being a capacity discharged over a period between a time when charging of the battery to a first available capacity thereof is completed and a time when the terminal voltage of the battery detected by the voltage detector reaches a voltage value corresponding to the current value detected by the current detector in the map data, and the available-capacity calculating unit also updating the first available capacity to the second available capacity.

2. The battery-capacity management device according to claim 1 provided in a golf cart.

3. The battery-capacity management device according to claim 1 further comprising:
    a remaining-capacity calculating unit that calculates a remaining capacity of the battery based on the second available capacity calculated by the available-capacity calculating unit and the specific discharged capacity calculated by the discharged-capacity calculating unit; and
    a display adapted to display information corresponding to the remaining capacity of the battery calculated by the remaining-capacity calculating unit.

4. The battery-capacity management device according to claim 3 provided in a golf cart.

5. The battery-capacity management device according to claim 1, further comprising:
    a controller that determines a degree of deterioration of the battery based on the second available capacity calculated by the available-capacity calculating unit,
    wherein the map data stored in the storage location is created to represent relationships between terminal voltages and discharge currents according to degrees of deterioration of the battery;
    the discharged-capacity calculating unit calculates the specific discharged capacity based on the map data corresponding to the degree of deterioration of the battery determined by the controller; and
    the available-capacity calculating unit calculates the second available capacity based on the calculated specific discharged capacity.

6. The battery-capacity management device according to claim 5 provided in a golf cart.

7. The battery-capacity management device according to claim 5 further comprising:
    a remaining-capacity calculating unit that calculates a remaining capacity of the battery based on the second available capacity calculated by the available-capacity calculating unit and the specific discharged capacity calculated by the discharged-capacity calculating unit; and
    a display adapted to display information corresponding to the remaining capacity of the battery calculated by the remaining-capacity calculating unit.

8. The battery-capacity management device according to claim 7 provided in a golf cart.

9. A battery-capacity management device comprising:
    a voltage detector that is adapted to detect a terminal voltage of a battery;
    a current detector that is adapted to detect a discharge current discharged from the battery;
    a battery-temperature detector that is adapted to detect a temperature of the battery;
    a discharged-capacity calculating unit that is adapted to calculate a discharged capacity of the battery;
    memory that is adapted to contain prestored map data that represents relationships among terminal voltages, discharge currents, and battery temperatures of the battery at states in which a remaining capacity of the battery has reached a preset value; and
    an available-capacity calculating unit that is adapted to calculate a second available capacity of the battery based on a specific discharged capacity, the specific discharged capacity being calculated by the discharged-capacity calculating unit and being a capacity discharged over a period between a time when charging of the battery to a first available capacity thereof is completed and a time when the terminal voltage of the battery detected by the voltage detector reaches a voltage value corresponding to the current value detected by the current detector and a battery temperature detected by the battery-temperature detector in the map data, and the available-capacity calculating unit updating the first available capacity to the second available capacity.

10. The battery-capacity management device according to claim 9 provided in a golf cart.

11. The battery-capacity management device according to claim 9 further comprising:
a remaining-capacity calculating unit that calculates a remaining capacity of the battery based on the second available capacity calculated by the available-capacity calculating unit and the specific discharged capacity calculated by the discharged-capacity calculating unit; and
a display adapted to display information corresponding to the remaining capacity of the battery calculated by the remaining-capacity calculating unit.

12. The battery-capacity management device according to claim 11 provided in a golf cart.

13. The battery-capacity management device according to claim 9, further comprising:
a controller that determines a degree of deterioration of the battery based on the second available capacity calculated by the available-capacity calculating unit,
wherein the map data stored in the memory is created to represent relationships between terminal voltages, discharge currents and battery temperatures according to degrees of deterioration of the battery;
the discharged-capacity calculating unit calculates the specific discharged capacity based on the map data corresponding to the degree of deterioration of the battery determined by the controller; and
the available-capacity calculating unit calculates the second available capacity based on the calculated specific discharged capacity.

14. The battery-capacity management device according to claim 13 provided in a golf cart.

15. The battery-capacity management device according to claim 13 further comprising:
a remaining-capacity calculating unit that calculates a remaining capacity of the battery based on the second available capacity calculated by the available-capacity calculating unit and the specific discharged capacity calculated by the discharged-capacity calculating unit; and
a display adapted to display information corresponding to the remaining capacity of the battery calculated by the remaining-capacity calculating unit.

16. The battery-capacity management device according to claim 15 provided in a golf cart.

* * * * *